(12) United States Patent
Maguire et al.

(10) Patent No.: US 8,863,342 B2
(45) Date of Patent: Oct. 21, 2014

(54) CLUTCH ASSEMBLY

(75) Inventors: Scott Andrew Maguire, Malmesbury (GB); Matthew Charles Edward Wilson, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 636 days.

(21) Appl. No.: 12/727,867

(22) Filed: Mar. 19, 2010

(65) Prior Publication Data

US 2010/0242223 A1 Sep. 30, 2010

(30) Foreign Application Priority Data

Mar. 27, 2009 (GB) .................................... 0905253.1

(51) Int. Cl.
*A47L 5/12* (2006.01)
*A47L 9/04* (2006.01)
*F16D 28/00* (2006.01)

(52) U.S. Cl.
CPC ............... *A47L 9/0427* (2013.01); *F16D 28/00* (2013.01); *A47L 9/0444* (2013.01)
USPC ............................................................ 15/3

(58) Field of Classification Search
USPC ......... 477/176–178; 192/103 R, 150, 556.55, 192/90; 15/389–390
See application file for complete search history.

(56) References Cited

U.S. PATENT DOCUMENTS

| | | | |
|---|---|---|---|
| 1,893,644 A * | 1/1933 | Fleischel | 477/87 |
| 2,052,428 A * | 8/1936 | Tyler | 477/176 |
| 2,112,318 A | 3/1938 | White et al. | |
| 2,144,074 A * | 1/1939 | Maybach | 477/176 |
| 2,277,554 A * | 3/1942 | McCoy | 192/56.3 |
| 2,302,110 A | 11/1942 | Dow et al. | |
| 2,400,585 A * | 5/1946 | Wolff | 192/56.55 |
| 2,696,581 A * | 12/1954 | Peterson | 318/475 |
| 2,881,891 A * | 4/1959 | Birkland et al. | 192/84.2 |
| 2,913,082 A * | 11/1959 | Becknell | 192/56.55 |
| 2,918,999 A | 12/1959 | William, Jr. | |
| 2,929,477 A | 3/1960 | Rodriguez et al. | |
| 2,966,977 A | 1/1961 | Johnson | |
| 2,973,067 A * | 2/1961 | Eddy, Jr. | 477/178 |

(Continued)

FOREIGN PATENT DOCUMENTS

| | | |
|---|---|---|
| GB | 2 363 976 | 1/2002 |
| GB | 2 414 283 | 11/2005 |

(Continued)

OTHER PUBLICATIONS

Maguire et al., U.S. Office Action mailed Nov. 15, 2012, directed to U.S. Appl. No. 12/727,868; 11 pages.

(Continued)

*Primary Examiner* — Rachel Steitz
*Assistant Examiner* — Jennifer Gill
(74) *Attorney, Agent, or Firm* — Morrison & Foerster LLP

(57) ABSTRACT

A clutch assembly for a surface treatment appliance includes an input clutch member, an output clutch member driven by the input clutch member, a motorized mechanism for effecting relative movement between the input clutch member and the output clutch member from an engaged position, in which torque is transmitted by the output clutch member to an output, to a disengaged position, in which torque is not transmitted to the output, and a control system for actuating the motorized mechanism.

14 Claims, 5 Drawing Sheets

(56) References Cited

U.S. PATENT DOCUMENTS

| | | | | |
|---|---|---|---|---|
| 3,058,563 A | * | 10/1962 | Petre | 192/116.5 |
| 3,752,284 A | * | 8/1973 | Brittain et al. | 192/103 F |
| 3,903,712 A | * | 9/1975 | Richter et al. | 464/31 |
| 3,924,421 A | | 12/1975 | Dehne et al. | |
| 4,019,614 A | * | 4/1977 | Prenzel et al. | 192/103 F |
| 4,099,291 A | * | 7/1978 | Bowerman | 15/390 |
| 4,172,505 A | * | 10/1979 | Rabus et al. | 180/290 |
| 4,235,321 A | | 11/1980 | Stein | |
| 4,245,370 A | * | 1/1981 | Baker | 15/319 |
| 4,295,551 A | * | 10/1981 | Zimmermann et al. | 477/89 |
| 4,317,253 A | | 3/1982 | Gut et al. | |
| 4,328,522 A | * | 5/1982 | Tryan | 361/33 |
| 4,331,226 A | * | 5/1982 | Heidemeyer et al. | 477/175 |
| 4,343,387 A | * | 8/1982 | Hofbauer | 477/89 |
| 4,361,060 A | * | 11/1982 | Smyth | 477/78 |
| 4,391,548 A | * | 7/1983 | Malish | 403/348 |
| 4,398,231 A | * | 8/1983 | Currence | 361/23 |
| 4,401,200 A | * | 8/1983 | Heidemeyer et al. | 477/176 |
| 4,468,988 A | * | 9/1984 | Hiramatsu | 477/65 |
| 4,488,625 A | * | 12/1984 | Nobumoto et al. | 192/3.58 |
| 4,561,529 A | * | 12/1985 | McIntosh | 192/56.31 |
| 4,566,570 A | | 1/1986 | Geisthoff | |
| 4,572,343 A | * | 2/1986 | Boffelli | 192/56.41 |
| 4,581,787 A | | 4/1986 | Torigoe et al. | |
| 4,627,525 A | * | 12/1986 | Geldec | 192/84.961 |
| 4,637,092 A | * | 1/1987 | Hayashi et al. | 15/319 |
| 4,648,496 A | * | 3/1987 | Petzold et al. | 477/39 |
| 4,665,773 A | * | 5/1987 | Hiramatsu et al. | 477/39 |
| 4,688,665 A | * | 8/1987 | Rowen | 477/176 |
| 4,722,426 A | * | 2/1988 | Bellanger | 477/175 |
| 4,722,429 A | * | 2/1988 | Kono | 477/175 |
| 4,760,902 A | * | 8/1988 | Bellanger | 477/172 |
| 4,766,641 A | * | 8/1988 | Daglow | 15/390 |
| 4,828,093 A | * | 5/1989 | Bertin et al. | 192/90 |
| 5,002,170 A | * | 3/1991 | Parsons et al. | 477/86 |
| 5,056,175 A | | 10/1991 | Stein et al. | |
| 5,355,983 A | * | 10/1994 | Radomski et al. | 192/56.3 |
| 5,403,250 A | * | 4/1995 | Juergens | 477/176 |
| 5,504,971 A | * | 4/1996 | McCormick | 15/340.2 |
| 5,505,676 A | * | 4/1996 | Bookshar | 477/178 |
| 5,678,671 A | * | 10/1997 | Leimbach et al. | 192/70.22 |
| 5,776,032 A | * | 7/1998 | Kurishige et al. | 477/175 |
| 5,806,640 A | * | 9/1998 | Kale | 192/12 C |
| 5,839,160 A | | 11/1998 | Wang et al. | |
| 5,993,350 A | * | 11/1999 | Lawrie et al. | 477/5 |
| 6,009,964 A | * | 1/2000 | Ishida | 180/6.5 |
| 6,035,984 A | | 3/2000 | Kosik et al. | |
| 6,044,520 A | | 4/2000 | Yamamoto | |
| 6,050,379 A | * | 4/2000 | Lyon | 192/54.1 |
| 6,227,999 B1 | * | 5/2001 | Wheeler | 477/174 |
| 6,267,189 B1 | | 7/2001 | Nielsen et al. | 180/53.1 |
| 6,282,747 B1 | * | 9/2001 | Morgan et al. | 15/340.2 |
| 6,443,287 B2 | * | 9/2002 | Bjørkgård | 192/90 |
| 6,640,951 B2 | * | 11/2003 | Bamberger et al. | 192/85.01 |
| 6,656,090 B2 | * | 12/2003 | Matsumura et al. | 477/171 |
| 6,691,849 B1 | * | 2/2004 | Dyson et al. | 192/55.1 |
| 6,702,086 B2 | * | 3/2004 | Ries-Mueller et al. | 192/103 F |
| 6,712,187 B2 | * | 3/2004 | Suzuki et al. | 192/13 R |
| 6,729,459 B2 | * | 5/2004 | Reinards et al. | 192/103 F |
| 6,889,804 B2 | * | 5/2005 | Inoue et al. | 192/3.26 |
| 7,048,106 B2 | * | 5/2006 | Hou | 192/103 F |
| 7,062,816 B2 | * | 6/2006 | Kasper et al. | 15/340.2 |
| 7,155,773 B2 | * | 1/2007 | Haeussermann et al. | 15/390 |
| 7,228,593 B2 | | 6/2007 | Conrad | |
| 7,403,360 B2 | * | 7/2008 | Cunningham | 361/31 |
| 7,562,415 B2 | | 7/2009 | Moon | |
| 7,665,172 B1 | | 2/2010 | Tran et al. | |
| 7,725,223 B2 | * | 5/2010 | Gordon et al. | 701/23 |
| 7,731,618 B2 | * | 6/2010 | Burlington et al. | 475/263 |
| 7,770,255 B2 | * | 8/2010 | Zahuranec et al. | 15/340.2 |
| 7,775,337 B2 | * | 8/2010 | Moshenrose et al. | 192/84.31 |
| 7,878,514 B1 | * | 2/2011 | Hopkins et al. | 280/47.26 |
| 7,895,706 B2 | | 3/2011 | Mitchell et al. | |
| 7,900,315 B2 | * | 3/2011 | Cunningham | 15/319 |
| 8,011,062 B2 | * | 9/2011 | Burlington | 15/390 |
| 8,011,063 B2 | * | 9/2011 | Sandberg | 15/390 |
| 8,037,571 B2 | * | 10/2011 | Butts et al. | 15/383 |
| 8,186,009 B2 | | 5/2012 | Smith et al. | |
| 8,222,850 B2 | * | 7/2012 | Su | 318/475 |
| 2005/0217069 A1 | | 10/2005 | Joung et al. | |
| 2005/0262656 A1 | * | 12/2005 | Van Landingham et al. | 15/261 |
| 2006/0037174 A1 | * | 2/2006 | Harding | 15/389 |
| 2006/0076035 A1 | | 4/2006 | McGee et al. | |
| 2006/0148616 A1 | | 7/2006 | Ray et al. | |
| 2007/0079469 A1 | * | 4/2007 | Cunningham | 15/319 |
| 2007/0136979 A1 | | 6/2007 | Zahuranec | |
| 2007/0163074 A1 | | 7/2007 | Moon | |
| 2007/0251796 A1 | * | 11/2007 | Moshenrose et al. | 192/84.3 |
| 2008/0105510 A1 | * | 5/2008 | Burlington et al. | 192/20 |
| 2008/0185252 A1 | * | 8/2008 | Sandberg | 192/45.1 |
| 2009/0089958 A1 | | 4/2009 | Dant et al. | |
| 2009/0313785 A1 | * | 12/2009 | Pedrazzini Bertolazzi | 15/412 |
| 2010/0088835 A1 | | 4/2010 | Crouch et al. | |
| 2010/0242223 A1 | * | 9/2010 | Maguire et al. | 15/389 |
| 2010/0242224 A1 | * | 9/2010 | Maguire et al. | 15/389 |
| 2010/0257693 A1 | * | 10/2010 | Sweeby et al. | 15/389 |
| 2010/0299868 A1 | | 12/2010 | Beskow et al. | |
| 2011/0078874 A1 | | 4/2011 | Dever | |
| 2011/0179596 A1 | * | 7/2011 | Krebs | 15/389 |
| 2012/0005857 A1 | * | 1/2012 | Tran et al. | 15/390 |

FOREIGN PATENT DOCUMENTS

| | | |
|---|---|---|
| GB | 2 450 853 | 1/2009 |
| WO | WO-2005/107553 | 11/2005 |
| WO | WO 2005107553 | * 11/2005 |
| WO | WO-2008/012620 | 1/2008 |

OTHER PUBLICATIONS

Maguire et al., U.S. Office Action mailed Jul. 30, 2013, directed to U.S. Appl. No. 12/727,868; 13 pages.

GB Search Report dated May 28, 2009, directed to corresponding GB Patent Application No. 0905253.1; 2 pages.

Maguire et al., U.S. Office Action dated Jun. 14, 2012, directed to U.S. Appl. No. 12/727,868; 13 pages.

* cited by examiner

CLUTCH ASSEMBLY

REFERENCE TO RELATED APPLICATIONS

This application claims the priority of United Kingdom Application No. 0905253.1, filed Mar. 27, 2009, the entire contents of which are incorporated herein by reference.

FIELD OF THE INVENTION

This invention relates to a clutch assembly for a surface treating appliance, and which may be used to drive an agitator of a vacuum cleaner.

BACKGROUND OF THE INVENTION

An upright vacuum cleaner typically comprises a main body containing dirt and dust separating apparatus, a cleaner head mounted on the main body and having a suction opening, and a motor-driven fan unit for drawing dirt-bearing air through the suction opening. The dirt-bearing air is conveyed to the separating apparatus so that dirt and dust can be separated from the air before the air is expelled to the atmosphere.

The suction opening is directed downwardly to face the floor surface to be cleaned. The separating apparatus can take the form of a filter, a filter bag or, as is known, a cyclonic arrangement. The present invention is not concerned with the nature of the separating apparatus and is therefore applicable to vacuum cleaners utilizing any of the above arrangements or another suitable separating apparatus.

A driven agitator, usually in the form of a brush bar, is supported in the cleaner head so as to protrude to a small extent from the suction opening. The brush bar comprises an elongate cylindrical core bearing bristles which extend radially outward from the core. Rotation of the brush bar causes the bristles to sweep along the surface of the carpet to be cleaned to loosen dirt and dust, and pick up debris. The suction of air causes air to flow underneath the sole plate and around the brush bar to help lift the dirt and dust from the surface of the carpet and then carry it from the suction opening through the cleaner head towards the separating apparatus.

The brush bar is normally driven by a motor and a drive belt connected to a shaft rotated by the motor. This brush bar may be driven by a dedicated brush bar motor, or it may be driven by the vacuum motor that powers the vacuum cleaner.

It is desirable to be able to bring the brush bar into and out of operation, for example depending on the type of floor surface to be cleaned. If the brush bar is driven by a dedicated motor, this motor may simply be switched off to deactivate the brush bar. On the other hand, if the agitator is driven by the vacuum motor a clutch assembly may be provided to transmit torque to the brush bar. When the brush bar is activated, the clutch is engaged so that torque generated by the motor is transmitted to the brush bar, whereas when the brush bar is deactivated the clutch is disengaged so that torque is not transmitted to the brush bar.

A problem which may be encountered with vacuum cleaners having such a brush bar is that, on occasion, the brush bar may become jammed if it becomes entangled with objects on the floor surface or if it is pressed hard on to the floor surface. This can overload the motor used to rotate the brush bar, which may lead to damage of the motor or the drive belt. When the brush bar is driven by a dedicated brush bar motor, it is relatively straightforward to sense that the brush bar has become jammed. For example, the rise in the current drawn by the brush bar motor, due to the increased torque required to rotate the brush bar, can be detected and the motor can be switched off if the current rise is above a threshold value. However, when the brush bar is driven by the vacuum motor the detection of such an overload condition can be more difficult and so one technique that has been proposed to limit the amount of torque applied to a jammed brush bar is to cause the drive belt to slip. While this can reduce the risk of damaging the vacuum motor, over time the drive belt can deteriorate and require replacement.

WO 2005/107553 describes a vacuum cleaner which uses a clutch assembly to transfer torque from the vacuum motor to the brush bar. The clutch assembly comprises an input clutch member connected to the vacuum motor by a first drive belt, and an output clutch member connected to the brush bar by a second drive belt. The clutch assembly comprises an actuator for disengaging the output clutch member from the input clutch member when there is a difference in their rotational speeds due to the jamming of the brush bar driven by the output clutch member. The actuator is activated by a temperature rise caused by friction between two contacting surfaces of the clutch assembly which are rotating at different speeds. When the user does not require the brush bar to rotate, for example when cleaning a hard floor surface, the user must manually disengage the clutch members. The clutch assembly is provided with a grip portion which the user manipulates to disengage the output clutch member from the input clutch member.

It is an aim of at least the preferred embodiment of the present invention to provide a clutch assembly for a surface treating appliance which can enable an agitator to be readily disengaged from a drive motor both when the brush bar becomes jammed and as required by a user, for example depending on the type of floor surface to be treated by the appliance.

SUMMARY OF THE INVENTION

In a first aspect, the present invention provides a clutch assembly for a surface treatment appliance, the clutch assembly comprising an input clutch member, an output clutch member driven by the input clutch member, a motorized mechanism for effecting relative movement between the input clutch member and the output clutch member from an engaged position, in which torque is transmitted by the output clutch member to an output, to a disengaged position, in which torque is not transmitted to the output, and a control system for actuating the motorized mechanism.

The motorized mechanism may be actuated as required to disengage the output clutch member from the input clutch member to inhibit the transmission of torque to the output.

For example, the control system may be configured to actuate the motorized mechanism depending on the rotational speed of the output clutch member. The rotational speed of the input clutch member may be predicted, for example through monitoring a current drawn by a motor used to drive the input clutch member, which in the preferred embodiment is the vacuum motor of the vacuum cleaner. In this case, the control system may be configured to actuate the motorized mechanism depending on a difference between a monitored rotational speed of the output clutch member and a predicted rotational speed of the input clutch member. A sensor, for example an optical sensor or a Hall effect sensor, may be provided for detecting the rotational speed of the output clutch member, and for outputting to the control system a signal indicative of the detected speed.

Alternatively, the control system may be configured to actuate the motorized mechanism depending on a difference between a monitored rotational speed of the output clutch member and a monitored rotational speed of the input clutch member. In this case, a further sensor may be provided for detecting the rotational speed of the input clutch member, and for outputting to the control system a signal indicative of the detected speed.

The control system may comprise a first controller for receiving the signals from the sensors, and for outputting a signal indicative of the difference between the monitored rotational speeds to a second controller. This second controller may be used to control the speed of vacuum motor, and to control other components of the surface treating appliance. Depending on the difference between the monitored rotational speeds, the second controller may instruct the first controller to activate the motorized mechanism to disengage the output clutch member from the input clutch member.

Alternatively, or additionally, the control system may be configured to actuate the motorized mechanism to disengage the output clutch member from the input clutch member in response to a signal, or to the operation of a switch, indicating that an agitator connected to the output is not to be driven. This signal may be generated by a sensor for detecting the type of surface upon which a surface treating appliance incorporating the agitator is located. In the absence of such a sensor, the appliance may be provided with a switch to enable a user to deactivate the agitator as required. The switch may be conveniently located on a main body of a surface treating appliance to enable a user to easily disengage the clutch members of the clutch assembly.

As another alternative, or additional, feature, the control system may be configured to effect relative movement between the input clutch member and the output clutch member in response to a signal indicating the orientation of a main body of the surface treating appliance relative to a cleaner head of the surface treating appliance. For example, the control system may be configured to disengage the output clutch member from the input clutch member in response to a signal indicating that the main body is in an upright position relative to the cleaner head. This signal may be provided by a sensor or tilt switch located in the main body of the surface treating appliance.

The motorized mechanism is preferably configured to move the output clutch member relative to the input clutch member between the engaged position and the disengaged position. The motorized mechanism preferably comprises a gear mechanism and a motor for actuating the gear mechanism to effect relative movement between the input clutch member and the output clutch member. The motorized mechanism may be configured to move an actuator so that movement of the actuator causes the output clutch member to move relative to the input clutch member. The actuator is preferably connected to the output clutch member, preferably by a bearing to allow the output clutch member to rotate relative to the actuator. The motorized mechanism is preferably configured to move the actuator towards or away from the input clutch member to effect said relative movement between the input clutch member and the output clutch member. A resilient member, preferably in the form of a helical spring, may be provided for urging the output clutch member towards the engaged position, in which case the motorized mechanism is configured to move the output clutch member against the bias of the resilient member.

The present invention also provides an agitator for a surface treatment appliance comprising a clutch assembly as aforementioned. This agitator is preferably in the form of a brush bar for a vacuum cleaner.

In a second aspect, the present invention provides a surface treatment appliance comprising an agitator, an input clutch member, an output clutch member driven by the input clutch member, a motorized mechanism for effecting relative movement between the input clutch member and the output clutch member from an engaged position, in which torque is transmitted by the output clutch member to the agitator, to a disengaged position, in which torque is not transmitted to the agitator, and a control system for actuating the motorized mechanism.

Features described above in relation to the first aspect of the invention are equally applicable to the second aspect of the invention, and vice versa.

Although an embodiment of the invention is described in detail with reference to a vacuum cleaner, it will be appreciated that the invention can also be applied to other forms of cleaning appliance. The term "surface treating appliance" is intended to have a broad meaning, and includes a wide range of machines for treating a surface. It includes, inter alia, machines which only apply suction to the surface, such as vacuum cleaners (dry, wet and wet/dry variants), so as to draw material from the surface, as well as machines which apply material to the surface, such as polishing/waxing machines, pressure washing machines and shampooing machines.

BRIEF DESCRIPTION OF THE DRAWINGS

An embodiment of the present invention will now be described, by way of example only, with reference to the accompanying drawings, in which.

DETAILED DESCRIPTION OF THE INVENTION

Figure 1:
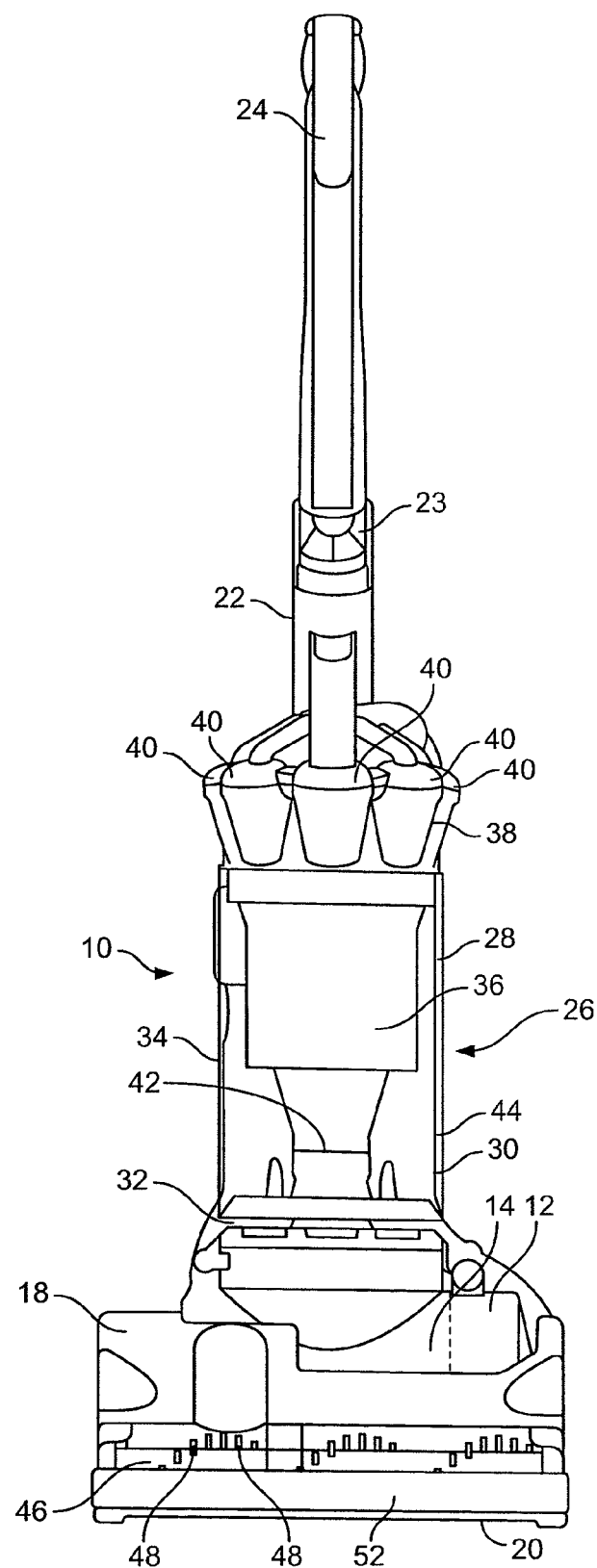
FIG. 1 is a front view of a surface treating appliance.
Figure 2:
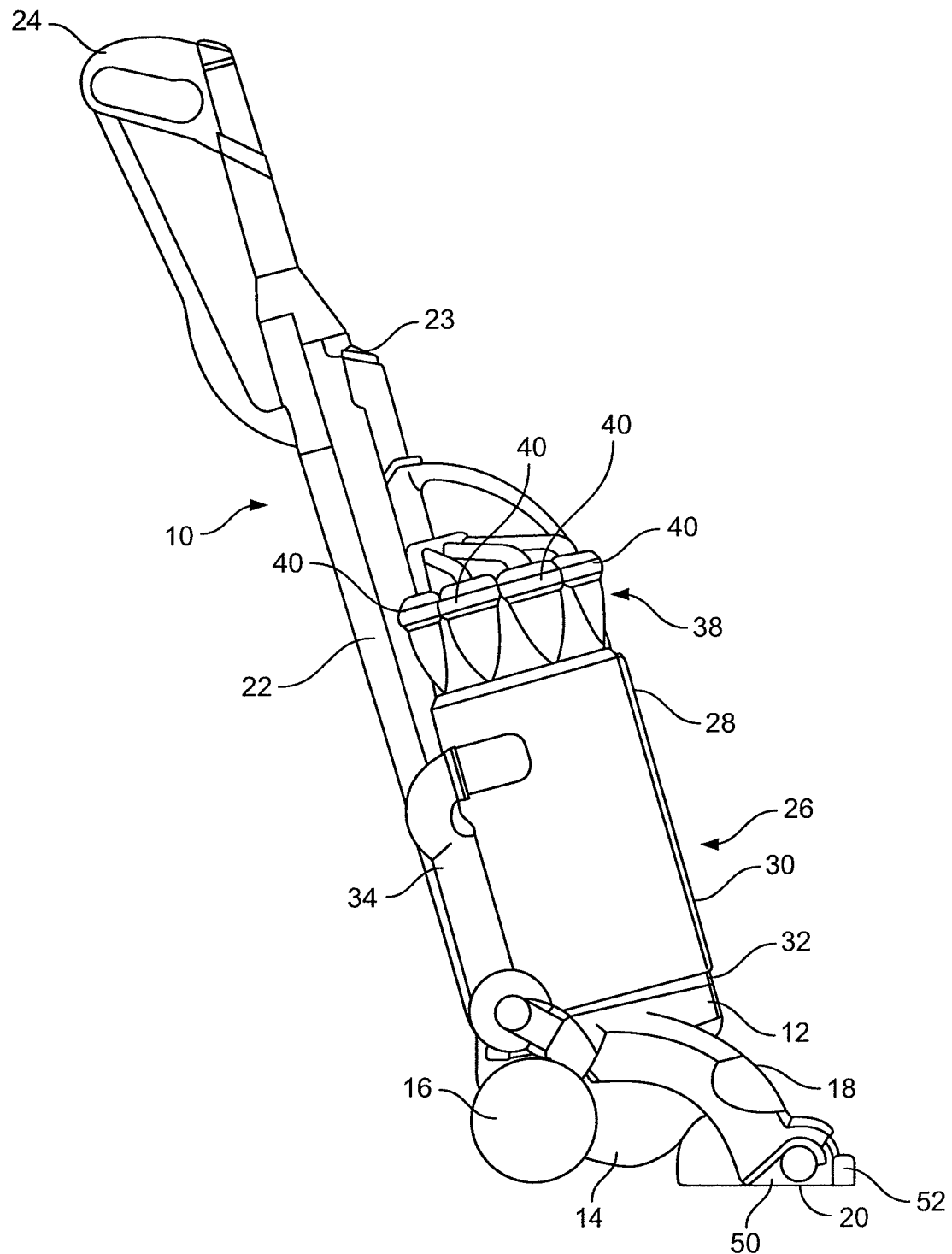
FIG. 2 is a side view of the surface treating appliance of FIG. 1.

With reference to FIGS. 1 and 2, a surface treating appliance in the form of an upright vacuum cleaner is shown and indicated generally by the reference numeral 10. The vacuum cleaner 10 comprises a main body 12 which includes a motor-driven fan unit 14 and a pair of wheels 16. A cleaner head 18 is pivotably mounted on the lower end of the main body 12. A suction opening 20 is provided in the underside of the cleaner head 18 so as to face the floor surface to be cleaned. The main body 12 further includes a spine 22 which extends vertically upward and merges into a hand grip 24. The spine 22 of the main body 12 comprises a plurality of user operable buttons 23 to enable the user to energize and de-energize the main vacuum motor of the fan unit 14, and to control various aspects of the cleaning operation. The hand grip 24 can be manipulated by a user to manoeuvre the vacuum cleaner 10 across the floor surface. FIG. 2 shows the vacuum cleaner 10 being used to clean a floor surface. The main body 12 has been reclined relative to the cleaner head 18 by the user, who employs the hand grip 24 to manoeuvre the vacuum cleaner 10 back and forth across the floor surface.

Separating apparatus 26 is releasably connected to the main body 12 of the vacuum cleaner 10. The separating apparatus 26 comprises a separator 28 and a collecting chamber 30. The separating apparatus 26 is supported adjacent the spine 22 of the main body 12 and above outlet ports 32 for exhausting air from the vacuum cleaner 10. The interior of the separating apparatus 26 is in fluid communication with the suction opening 20 through an inlet duct 34 located adjacent the spine 22 of the main body 12. The separating apparatus 26 can be removed from the main body 12 for emptying and for maintenance.

In use, the fan unit 14 draws dirt-bearing air into the vacuum cleaner 10 through the suction opening 20. The dirt-bearing air is carried to the separating apparatus 26 by the inlet duct 34. The collecting chamber 30 of the separating apparatus 26 includes an upstream cyclone. The dirt-bearing air is encouraged to follow a helical path around the interior of the upstream cyclone, which causes dirt and dust to be separated from the air. A shroud 36 is located in the upstream cyclone. The shroud 36 comprises a cylindrical wall having a plurality of through-holes. The shroud 36 provides a communication path between the upstream cyclone and a downstream cyclone assembly 38. The downstream cyclone assembly 38 comprises a plurality of downstream cyclones 40 arranged in parallel. Each downstream cyclone 40 is in communication with a downstream collector 42 forming part of the collecting chamber 30. Each of the downstream cyclones 40 has a diameter smaller than that of the upstream cyclone. Therefore, the downstream cyclones 40 are able to separate smaller particles of dirt and dust from the partially-cleaned airflow than the upstream cyclone. Separated dirt and dust exits the downstream cyclones 40 and passes into the downstream collector 42.

Cleaned air then flows back up through the downstream cyclones 42 and enters an outlet duct 44. The cleaned air then passes from the outlet duct 44 sequentially through a pre-motor filter, the fan unit 14, and a post-motor filter before being exhausted from the vacuum cleaner 10 through the outlet ports 32.

An agitator in the form of a brush bar 46 is rotatably arranged in the cleaner head 18. The brush bar 46 comprises an elongate cylinder that extends across almost the full width of the suction opening 20. The brush bar 46 has a pattern of tufts of bristles 48 arranged in a helical pattern on its outer surface. The brush bar 46 may be arranged to extend through the suction opening 20 so that, in use, its bristles 48 engage with carpet fibres, thereby helping to dislodge dirt and dust from within the carpet. The brush bar 46 is arranged inside a protective brush bar housing 50. A bumper strip 52 further protects the brush bar 46 from impact with obstacles during use.

Figure 3:
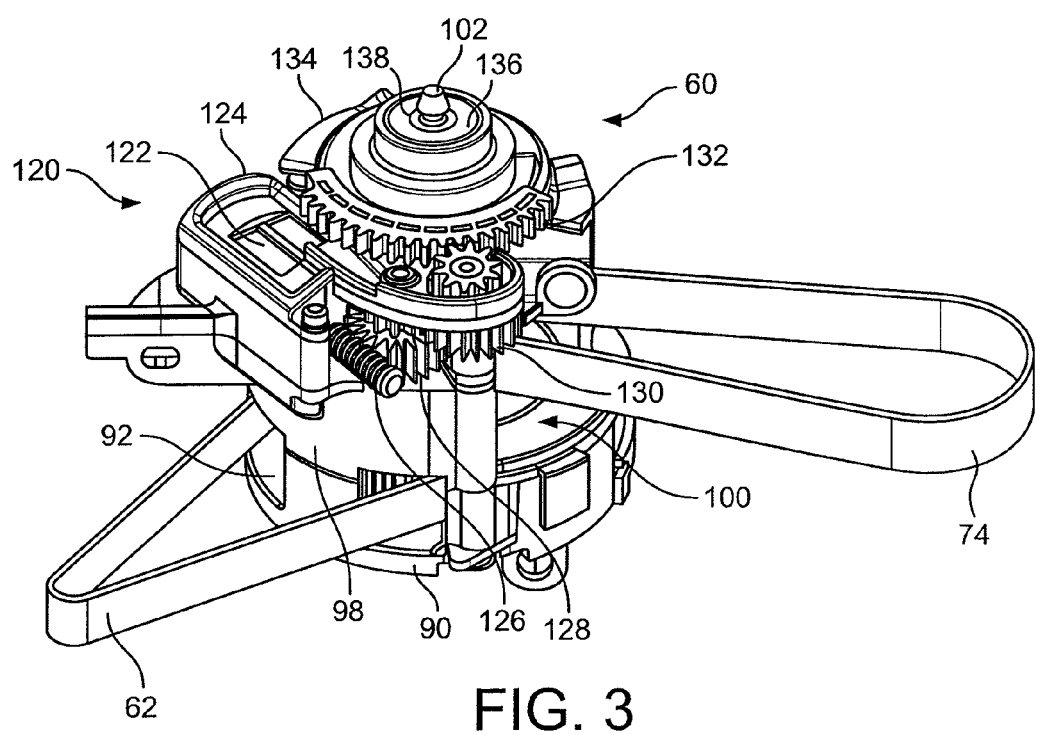
FIG. 3 is a perspective view of a clutch assembly for use in the appliance of FIG. 1.
Figure 4:
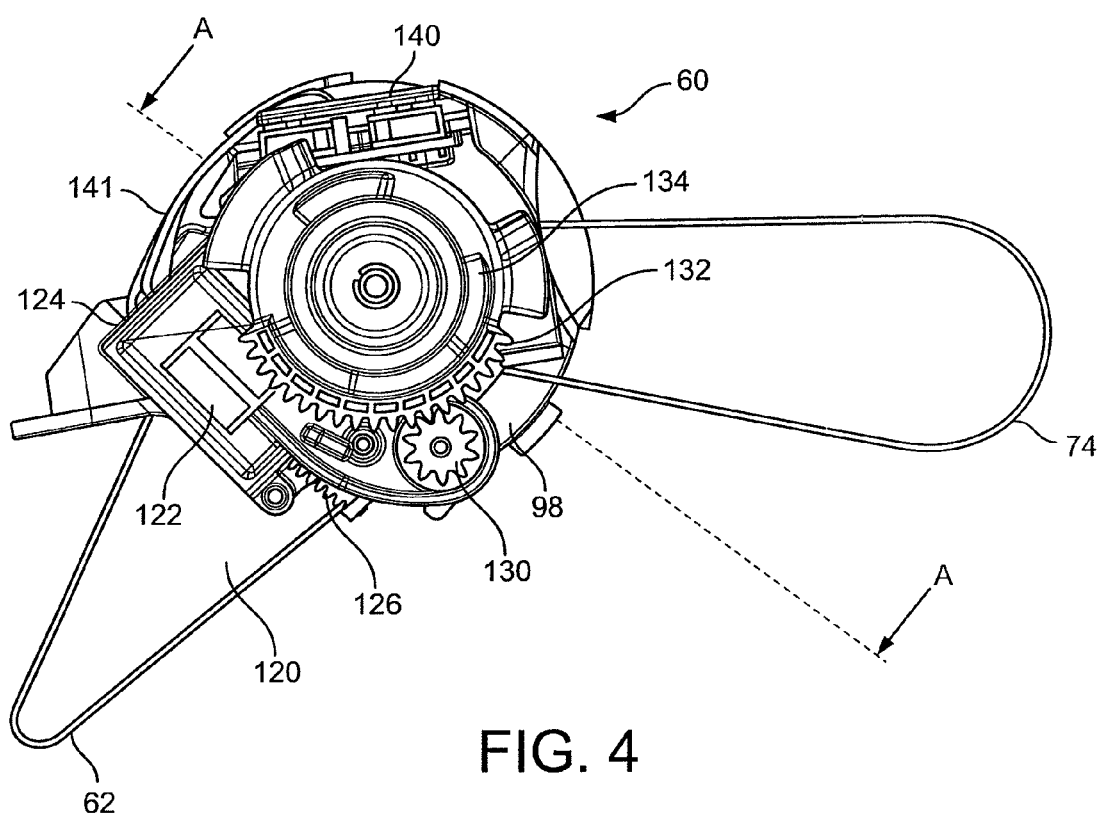
FIG. 4 is a top view of the clutch assembly of FIG. 3.
Figure 5:
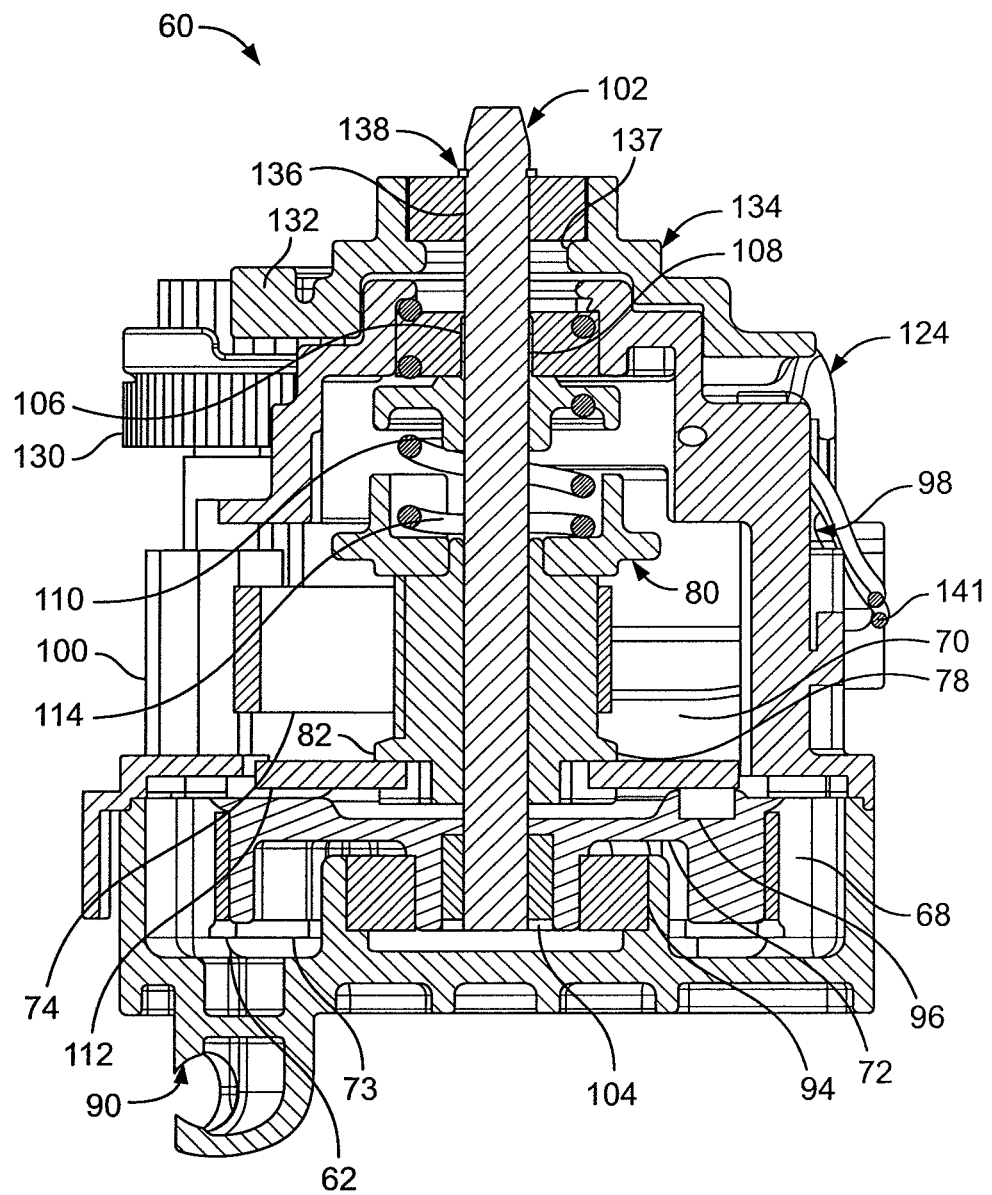
FIG. 5 is a sectional view taken along line A-A in FIG. 4.

With reference to FIGS. 3 to 6, the brush bar 46 is rotated within the brush bar housing 50 by the vacuum motor 54 of the fan unit 14. The vacuum motor 54 is connected to the brush bar 46 by a clutch assembly 60. An input drive belt 62 transfers torque from the vacuum motor 54 to the clutch assembly 60. The vacuum motor 54 comprises a drive shaft 64 and a motor pulley 66 connected to the drive shaft 64 for rotation therewith. The input drive belt 62 is received within a groove formed in the motor pulley 66. The clutch assembly 60 comprises an input clutch member 68 and an output clutch member 70 which is driven by the input clutch member 68. The input clutch member 68 comprises an input pulley 72 for receiving the input drive belt 62 so that the input clutch member 68 can be driven by the vacuum motor 54. The input drive belt 62 is retained between a flange 73 located beneath (as illustrated in FIG. 5) the input pulley 72 and a circumferential lip formed on the upper surface of the input pulley 72.

An output drive belt 74 transfers torque from the clutch assembly 60 to the brush bar 48. The brush bar 48 comprises a brush bar pulley 76 which rotates with the brush bar 48. The output drive belt 74 is received within a groove formed in the brush bar pulley 76. The output clutch member 70 comprises an output pulley 78 for receiving the output drive belt 74 so that the brush bar 48 can be driven by the output clutch member 70. The output drive belt 74 is retained between a lower washer 80 mounted on the output pulley 78 and a circumferential lip 82 formed on the base of the output pulley 78.

The relative diameters of the pulleys 66, 72, 76, 78 are designed to gear down the rotational speed of the vacuum motor 54, which is in the range from 30,000 to 40,000 rpm, to a suitable rotation speed for the brush bar 46. A suitable rotational speed for a brush bar is in the range from 2,500 to 5,000 rpm.

The clutch assembly 60 is illustrated in more detail in FIG. 5. The input clutch member 68 is housed within a base clutch housing 90 comprising apertures 92 through which the input drive belt 62 extends. The input pulley 72 is rotatably supported within the base clutch housing 90 by a rolling bearing 94 press fitted on to the input pulley 72. A plurality of clutch pads 96 are located on the upper surface of the input pulley 72 for engaging with a surface of the output clutch member 70. In this embodiment the input clutch member 68 comprises three clutch pads 96, but any number of clutch pads may be provided.

The output clutch member 70 is housed within a main clutch housing 98 connected to the base clutch housing 90, and comprising at least one aperture 100 through which the output drive belt 74 extends. The output pulley 78 and the lower washer 80 of the output clutch member 70 are mounted on a spindle 102. The input pulley 72 extends about a lower end portion of the spindle 102, and comprises a needle bearing 104 which supports the lower end portion of the spindle 102 for rotation relative to the input pulley 72. The upper end portion of the spindle 102 is supported by a rolling bearing 106 for rotation relative to the main clutch housing 88. The rolling bearing 106 is mounted on a collar 108 of an upper washer 110 which extends about the spindle 102.

The output clutch member 70 comprises a clutch plate 112 for engaging with the clutch pads 96 of the input clutch member 68. The clutch plate 112 is connected to the lower end of the output pulley 78. A resilient member in the form of a helical spring 114 is located between the lower washer 80 and the upper washer 110 and biased so as to urge the rolling bearing 106 towards the main clutch housing 98 and the clutch plate 112 towards the clutch pads 96.

Figure 6:
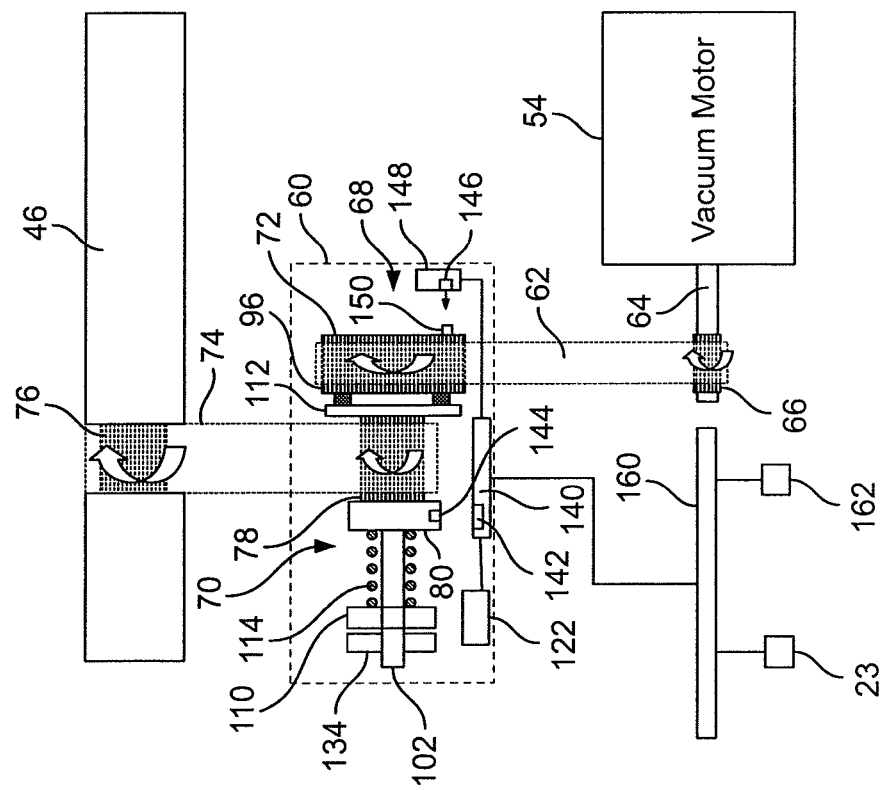
FIG. 6 is a schematic illustration of the clutch members of the clutch assembly of FIG. 3 in an engaged position.

FIGS. 5 and 6 illustrate the input clutch member 68 and the output clutch member 70 in an engaged position. The bias of the helical spring 114 urges the clutch plate 112 of the output clutch member 70 against the clutch pads 96 of the input clutch member 68. Consequently, any rotation of the input clutch member 68 causes the output clutch member 70 to rotate. This is the normal driving condition of the clutch assembly 60. When the vacuum motor 54 rotates the motor pulley 66, the input pulley 72 is rotated by the input drive belt 62. This causes the input clutch member 68 to rotate and, due to the engagement between the clutch pads 96 and the clutch plate 112, causes the output clutch member 70 to rotate. The rotation of the output pulley 78 causes the brush bar pulley 76 to be rotated by the output drive belt 74, thereby causing the brush bar 46 to rotate, through the transmission of torque from the vacuum motor 54 to the brush bar 46, to dislodge dirt and dust from within the carpet.

When the rotating brush bar 46 engages a carpeted surface, a counter torque acts on the brush bar 46 to oppose the rotation of the brush bar 46. Depending on the level of the counter torque, the clutch plate 112 can start to slip relative to the clutch pads 96, thereby reducing the rotational speed of the brush bar 46. This results in relative rotation between the clutch members 68, 70 of the clutch assembly 60. If the counter torque becomes excessive, for example if the brush bar 46 becomes entangled with a cable or with long carpet pile, this can result in damage occurring to the vacuum motor 54 and the clutch assembly 60.

In view of this, the clutch assembly 60 comprises a motorized mechanism 120 for effecting relative movement between the input clutch member 68 and the output clutch member 70 from the engaged position to a disengaged position in which the output clutch member 70 is spaced from the input clutch member 68 so that no torque is transmitted to the brush bar 46 from the vacuum motor 54. With reference to FIGS. 3 and 4, the motorized mechanism 120 comprises a gear mechanism and a motor 122 for actuating the gear mechanism to effect relative movement between the input clutch member 68 and the output clutch member 70. The motor 122 is housed within a motor housing 124 connected to the main clutch housing 98 of the clutch assembly 60. The gear mechanism comprises a worm gear 126 connected to a drive shaft of the motor 122 for rotation therewith. The gear mechanism further comprises a first compound gear 128 which meshes with the worm gear 126, and a second compound gear 130 which meshes with the first compound gear 128. Each of the compound gears 128, 130 is mounted on a respective rotary shaft received in a bore formed in the main clutch housing 98.

The second compound gear 130 meshes with a toothed section 132 of the outer periphery of an annular actuator 134 mounted on the spindle 102. The actuator 134 is shaped so that rotation of the actuator 134 by the gear mechanism causes the actuator 134 to move in an axial direction, that is, in a direction parallel to the longitudinal axis of the spindle 102, towards or away from the input clutch member 68. The spindle 102 is rotatably supported by a rolling bearing 136 press fitted into the actuator 134 so as to be mounted on an annular lip 137 extending radially inwardly from the inner periphery of the actuator 134. A clip 138 is located over the upper end of the spindle 102 to inhibit axial movement of the rolling bearing 136 relative to the spindle 102. Consequently, any movement of the actuator 134 in the axial direction causes the spindle 102, and thus the output clutch member 70, to move in the same direction.

The motorized mechanism 120 is actuated by a control system. The control system comprises a clutch controller 140 connected to the motor 122 for causing a rotor of the motor 122 to rotate in either a clockwise or an anticlockwise direction so as to cause the gear mechanism to move the actuator 134 in a selected axial direction. In this embodiment, the clutch controller 140 comprises a printed circuit board mounted on the main clutch housing 98, and is connected to the motor 122 by leads 141 extending between the printed circuit board and the motor 122.

In this embodiment, the control system is configured to actuate the motorized mechanism 120 depending on the difference between the rotational speed of the output clutch member 70 and the rotational speed of the input clutch member 68. With reference to FIG. 6, a sensor 142 is connected to the printed circuit board of the clutch controller 140 for detecting the rotational speed of a first magnet 144 mounted on the lower washer 80 of the output clutch member 70. A second sensor 146 is connected to a printed circuit board 148 mounted on the base clutch housing 90 for detecting the rotational speed of a second magnet 150 mounted on the input pulley 72 of the input clutch member 68. Each of these sensors 142, 146 is preferably in the form of a Hall Effect sensor.

Signals output from the sensors 142, 146 are received by the first controller 140. From these signals, the clutch controller 140 determines the magnitude of the difference between the rotational speeds of the input clutch member 68 and the output clutch member 70.

Figure 7:
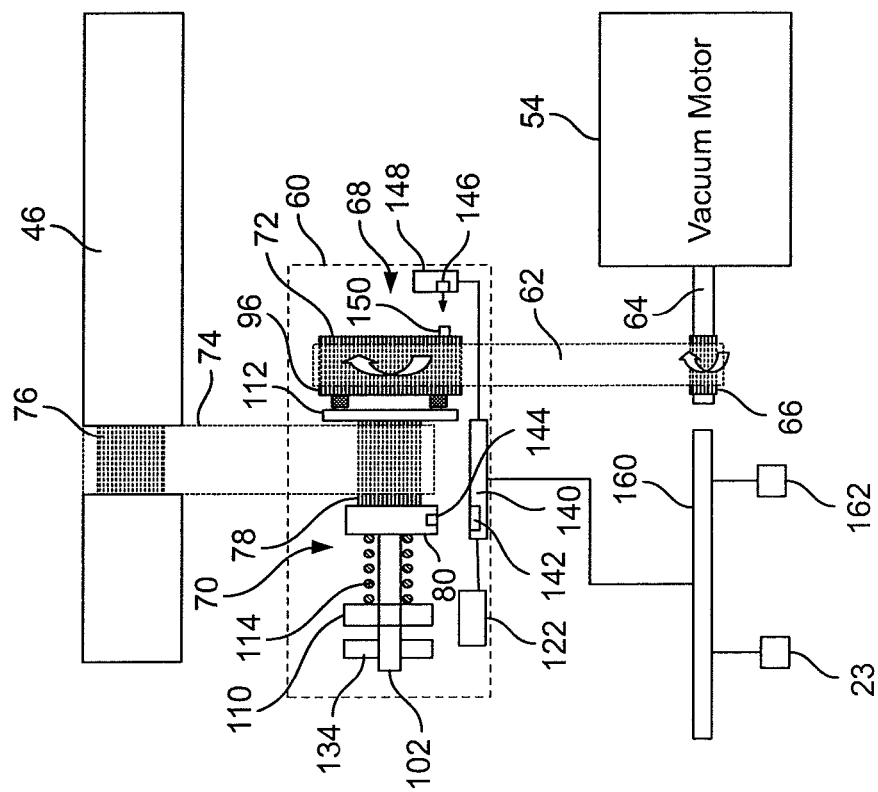
FIG. 7 is a schematic illustration of the clutch members of the clutch assembly of FIG. 3 in a disengaged position.

The clutch controller 140 outputs a signal indicative of this magnitude to a main controller 160 of the vacuum cleaner 10, which is configured, inter alia, to actuate the vacuum motor 54 in response to operation of one of the buttons 23 located on the vacuum cleaner 10. Depending on the magnitude of the difference between the rotational speeds of the input clutch member 68 and the output clutch member 70, the main controller 160 may output a first command signal to the clutch controller 140 which instructs the clutch controller 140 to actuate the motor 122 to disengage the output clutch member 70 from the input clutch member 68. For example, the main controller 160 may be programmed to output this first command signal in the event that the difference between the rotational speeds of the input clutch member 68 and the output clutch member 70 is greater than 200 rpm. Upon receipt of this first command signal, the clutch controller 140 actuates the motor 122 to rotate the gear mechanism in such a manner as to cause the actuator 134 to move away from the input clutch member 68. This in turn causes the output clutch member 70 to move away from the input clutch member 68 against the bias of the helical spring 114 to the disengaged position illustrated in FIG. 7, in which the clutch plate 112 of the output clutch member 70 is spaced from the clutch pads 96 of the input clutch member 68. As a result, no torque is transmitted from vacuum motor 54 to the brush bar 46, and so the brush bar 46 stops rotating. An alert may be generated to advise a user that the brush bar 46 has been deactivated. For example, one of the buttons 23 may be illuminated by an LED to advise the user that the brush bar 46 has been deactivated.

Once the user has cleared the restriction on the rotation of the brush bar 46, for example by removing hairs or other items which have become entangled with the brush bar 46, the user presses one of the buttons 23 to instruct the main controller 160 to re-activate the brush bar 46. In response to the depression of this button, the main controller 160 issues a second command signal to the clutch controller 140 which instructs the clutch controller 140 to actuate the motor 122 to re-engage the output clutch member 70 with the input clutch member 68. Upon receipt of this second command signal, the clutch controller 140 actuates the motor 122 to rotate the gear mechanism in reverse so as to cause the actuator 134 to move back towards the input clutch member 68. This in turn causes the output clutch member 70 to move towards the input clutch member 68 so that the clutch plate 112 of the output clutch member 70 engages with the clutch pads 96 of the input clutch member 68. As a result, torque is re-transmitted from vacuum motor 54 to the brush bar 46 to cause the brush bar 46 to rotate.

The main controller 160 may be programmed to issue one of these command signals to the clutch controller 140 in response to one or more different events. For example, the main controller 160 may be programmed to issue the first command signal to the clutch controller 140 in response to the depression of one of the buttons 23. This button 23 may be the same as that used to re-activate the brush bar 46 following clearance of a restriction on the rotation of the brush bar 46, and may be depressed by the user in the event that the vacuum cleaner 10 is to be used to clean a hard floor surface or other surface which does not require the rotation of the brush bar 46 to dislodge dirt and dust from the floor surface.

As another example, the main controller 160 may be programmed to issue an appropriate one of the command signals in response to a signal received from a sensor 162 of the vacuum cleaner 10. This sensor 162 may be configured to detect the orientation of the main body 12 of the vacuum cleaner 10 relative to the cleaner head 18, and may be located towards the base of the main body 10. For example, when the vacuum cleaner 10 is in a reclined position, as illustrated in FIG. 2, the vacuum cleaner 10 is in a suitable configuration to be manoeuvred over a floor surface, and so the main controller 160 may issue the second command signal to the clutch controller 140 to ensure that the brush bar 46 is activated when the vacuum cleaner 10 is in a reclined position. When the sensor 162 detects that the vacuum cleaner 10 has been returned to an upright position, for example, following a cleaning operation, the main controller 160 may issue the first command signal to the clutch controller 140 to cause the brush bar 46 to be de-activated.

The invention claimed is:

1. A clutch assembly for a surface treatment appliance comprising a vacuum motor and an agitator, the clutch assembly comprising an input clutch member arranged to be driven by the vacuum motor, an output clutch member arranged to be driven by the input clutch member, the output clutch member arranged to drive the agitator, a motorized mechanism comprising a gear mechanism and an actuation motor, not the vacuum motor, for actuating the gear mechanism to effect relative movement between the input clutch member and the output clutch member from an engaged position, in which torque is transmitted by the output clutch member to the agitator, to a disengaged position, in which torque is not transmitted to the agitator, and a control system for actuating the motorized mechanism, the control system comprising an electrical controller that controls the actuation motor based on a received signal in response to the difference in rotational speeds between the input and output clutch members.

2. The clutch assembly of claim 1, wherein the motorized mechanism is configured to engage an actuator connected to the output clutch member.

3. The clutch assembly of claim 2, wherein the actuator is connected to the output clutch member by a bearing to allow the output clutch member to rotate relative to the actuator.

4. The clutch assembly of claim 2, wherein the motorized mechanism is configured to move the actuator towards or away from the input clutch member to effect said relative movement between the input clutch member and the output clutch member.

5. The clutch assembly of claim 1, comprising a resilient member for urging the output clutch member towards the engaged position, and wherein the motorized mechanism is configured to move the output clutch member towards the disengaged position against the bias of the resilient member.

6. The clutch assembly of claim 1, comprising a sensor for detecting the rotational speed of the output clutch member, and for outputting to the control system a signal indicative of the detected speed.

7. The clutch assembly of claim 6, comprising a further sensor for detecting the rotational speed of the input clutch member, and for outputting to the control system a signal indicative of the detected speed.

8. A surface treatment appliance comprising a vacuum motor and an agitator, an input clutch member arranged to be driven by the vacuum motor, an output clutch member arranged to be driven by the input clutch member, the output clutch member arranged to drive the agitator, a motorized mechanism comprising a gear mechanism and an actuation motor, not the vacuum motor, for actuating the gear mechanism to effect relative movement between the input clutch member and the output clutch member from an engaged position, in which torque is transmitted by the output clutch member to the agitator, to a disengaged position, in which torque is not transmitted to the agitator, and a control system for actuating the motorized mechanism, the control system comprising an electrical controller that controls the actuation motor based on a received signal in response to the difference in rotational speeds between the input and output clutch members.

9. The appliance of claim 8, wherein the motorized mechanism is configured to engage an actuator connected to the output clutch member.

10. The appliance of claim 9, wherein the actuator is connected to the output clutch member by a bearing to allow the output clutch member to rotate relative to the actuator.

11. The appliance of claim 9, wherein the motorized mechanism is configured to move the actuator towards or away from the input clutch member to effect said relative movement between the input clutch member and the output clutch member.

12. The appliance of claim 8, comprising a resilient member for urging the output clutch member towards the engaged position, and wherein the motorized mechanism is configured to move the output clutch member towards the disengaged position against the bias of the resilient member.

13. The appliance of claim 8, comprising a sensor for detecting the rotational speed of the output clutch member, and for outputting to the control system a signal indicative of the detected speed.

14. The appliance of claim 13, comprising a further sensor for detecting the rotational speed of the input clutch member, and for outputting to the control system a signal indicative of the detected speed.

* * * * *